United States Patent [19]

Müller et al.

[11] 4,054,329
[45] Oct. 18, 1977

[54] ANTILOCKING CONTROL SYSTEM FOR VEHICLES

[75] Inventors: Hans Müller; Hans-Herbert Wupper; Wolf-Dieter Jonner, all of Sandhausen, Germany

[73] Assignee: Teldix GmbH, Heidelberg, Germany

[21] Appl. No.: 698,198

[22] Filed: June 21, 1976

[30] Foreign Application Priority Data

June 20, 1975 Germany .............................. 2527471

[51] Int. Cl.$^2$ .............................................. B60T 8/02
[52] U.S. Cl. ....................................... 303/106; 303/20
[58] Field of Search ..................... 188/181; 303/20, 97, 303/92, 105, 106; 317/5; 340/53, 62; 361/238

[56] References Cited

U.S. PATENT DOCUMENTS

| 3,754,797 | 8/1973 | Rodi et al. .................... 188/181 C X |
| 3,832,013 | 8/1974 | Davis et al. .......................... 303/106 |
| 3,883,183 | 5/1975 | Burckhardt et al. ................ 303/106 |
| 3,888,548 | 6/1975 | Sharp ..................................... 303/97 |
| 3,966,267 | 6/1976 | McNinch, Jr. et al. ............. 303/106 |

*Primary Examiner*—Stephen G. Kunin
*Attorney, Agent, or Firm*—Spencer & Kaye

[57] ABSTRACT

An antilocking control system for the wheel brakes of a vehicle wherein the control system is of the type including sensors for monitoring the rotational behavior of the wheels, an evaluation circuit which receives the signals from the sensors and which generates control signals based on the signals from the sensors, and a pressure reduction unit which receives the control signals and which has a setting for pressure buildup, a setting for pressure reduction, and a setting for keeping the pressure at least approximately constant; and wherein the evaluation circuit includes a switching arrangement for emitting a control signal for causing pressure reduction upon the occurrence of a tendency to lock, for emitting a control signal for keeping the pressure constant upon a wheel acceleration of a certain value, and for normally also emitting a control signal for keeping the pressure constant in the transition phase between the end of the control signal for reducing pressure and the beginning of the signal indicating wheel acceleration ($U_{+b}$). The evaluation circuit further includes a monitoring circuit for determining whether within a given period of time T1 after the end of a pressure reduction signal a wheel acceleration signal ($U_{+b}$) occurs and, upon the absence of such a signal within the period of time T1, for effecting a change in the normal regulation operation by causing the pressure reduction in subsequent control cycles to be terminated only upon the occurrence of an acceleration signal ($U_{+b}$), and a further switching arrangement for resetting the system to normal operation T1 when an acceleration signal appears within a time period T2 < T1 after the end of a subsequent pressure reduction signal.

10 Claims, 6 Drawing Figures

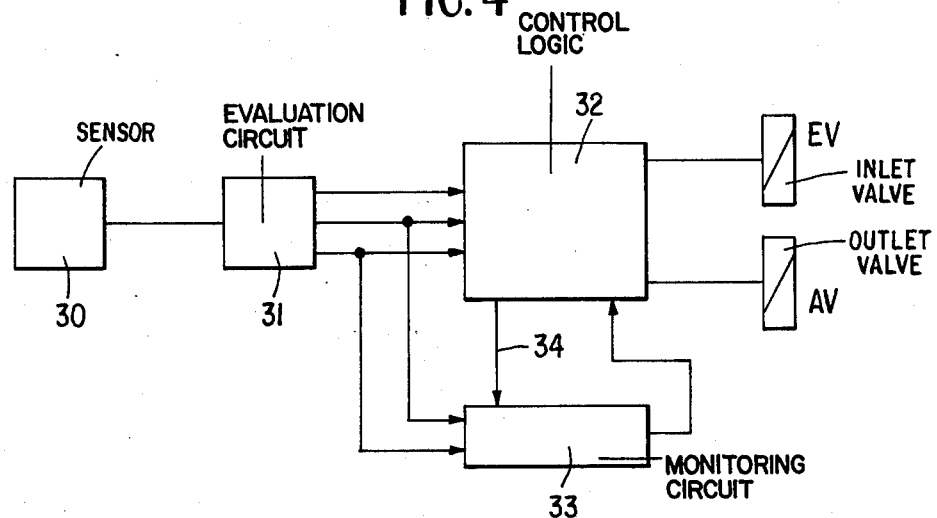
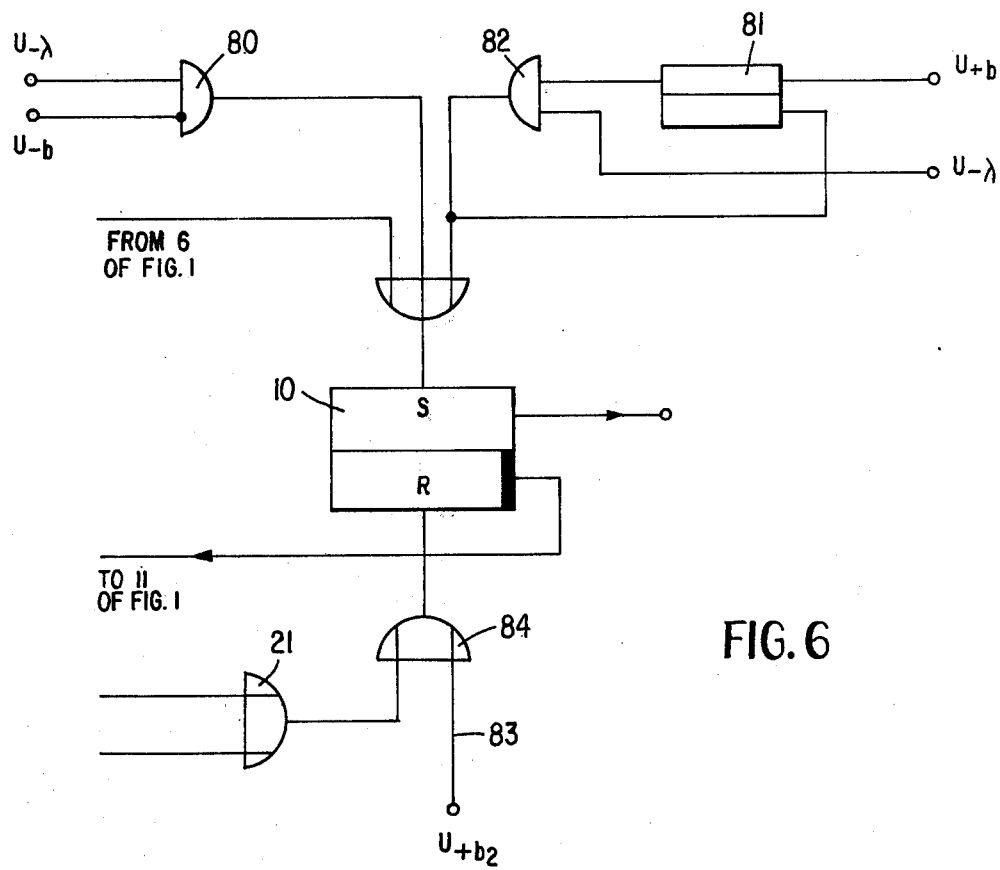

ANTILOCKING CONTROL SYSTEM FOR VEHICLES

BACKGROUND OF THE INVENTION

The present invention relates to an antilocking control system for the wheel brakes of vehicles of the type comprising sensors for monitoring the acceleration behavior of the vehicle wheels, an evaluation circuit which receives the signals from the sensors and which produces control signals from these signals, and a brake pressure control unit which receives the control signals from the evaluation circuit and which, in addition to a setting for pressure buildup, also has settings for brake pressure reduction and for at least approximately keeping the brake pressure constant. More particularly, the present invention relates to such an antilocking control system for the wheel brakes of a vehicle wherein the evaluation circuit includes a switching arrangement which produces a control signal for pressure reduction upon the occurrence of a tendency to lock, a control signal for keeping the pressure constant upon the subsequent occurrence of a wheel acceleration of a certain value, and normally also produces a control signal to keep the pressure constant in the transistion range between the end of the control signal for pressure reduction and the beginning of the control signal produced upon wheel acceleration ($U_{+b}$).

Such an antilocking control system is known, for example, from German Pat. No. 1,655,380 which corresponds to U.S. Pat. No. 3,467,444, issued September 16th, 1969 to H. Leiber, the subject matter of which is incorporated herein. This patent, however, also provides a second lower deceleration threshold to effect a constant pressure which is of no significance to the present invention. In this known system, as soon as a higher deceleration threshold value has been exceeded, and until deceleration drops below that threshold value, the pressure is reduced; upon the occurrence of an acceleration signal the pressure is kept constant; and a memory member is provided which is charged when the outlet valve is enabled and discharged via the inlet valve at the end of the actuation of the outlet valve. Because of this discharge, the inlet valve remains excited, i.e., closed, at the end of the deceleration signal, i.e., there will be no immediate pressure buildup, rather the pressure is kept constant. The time constant of the delay member or memory is selected so that the interval between the end of the deceleration signal and the beginning of the acceleration signal is bridged, i.e., the pressure is kept constant during this time.

SUMMARY OF THE INVENTION

In contradistinction to the above mentioned known mode of operation, it is the object of the present invention to not only prevent immediate pressure buildup at the end of the signal indicating a tendency to lock, but under certain road conditions which produce only a slow reacceleration of wheels, to extend the period of pressure reduction.

This is accomplished, according to the present invention in a system as described above, in that the evaluation circuit includes a monitoring circuit which determines whether within a given period of time T1 after the end of the pressure reduction signal there occurs a wheel acceleration signal ($U_{+b}$) and which, when there is no such signal, changes the normal regulation operation to special regulation operation in that pressure reduction in subsequent is terminated only by the occurrence of an acceleration signal ($U_{+b}$), and further switching means are provided to reset the system to normal regulation operation if an acceleration signal ($U_{+b}$) occurs within a time period T2 < T1 after the end of a subsequent pressure reduction signal.

In the arrangement according to the invention there are thus two operating states, namely the known normal operation and a special operation which becomes effective under certain road conditions and remains effective until certain criteria indicate that the system can be switched back to normal operation. The special road conditions are present if the wheel will not reaccelerate or reaccelerates only slowly, i.e., if sufficient wheel acceleration has not been noted a certain time after the end of the pressure reduction. Under such road conditions — and these are road conditions with low $\mu$ and also when braking through curves — pressure reduction was insufficient and in the present control cycle, once this state has been detected and until the acceleration signal reoccurs, pressure reduction takes place as it does in the following cycles principally from the occurrence of the signal indicating a tendency to lock until the occurrence of a wheel acceleration signal. This state remains in force until a relatively early occurrence of the acceleration signal during the extended pressure reduction phase — i.e., an improvement in the road conditions — causes the system to be switched back to normal operation.

For example, the time period T2 is selected to be about half as long as the time period T1. According to one embodiment of the invention, a bistable member is provided which is set upon the occurrence of the deceleration signal and, if a signal is still present at the setting output of this bistable member at the end of time period T1, this setting output signal serves to set a second bistable member whose output signal is then used to reduce pressure at the end of the deceleration signal if no acceleration signal is present. This second bistable member is reset by an acceleration signal occurring before the end of time period T2 after the end of a deceleration signal.

Additional switching means may be provided which respond at the end of the acceleration signal if a slip signal is still present and which also switch the system to special regulation operation with pressure reduction after the deceleration signal or slip signal until an acceleration signal appears.

On the other hand if a second higher acceleration threshold value is used, the exceeding of that second threshold can be utilized to cancel switching to special regulation operation with extended pressure reduction.

BRIEF DESCRIPTION OF THE DRAWINGS

FIG. 4 is a block diagram of a antilocking control system.

FIG. 6 is a circuit diagram representing a modification of the circuit of FIG. 1.

DETAILED DESCRIPTION OF THE PREFERRED EMBODIMENT

Figure 1:
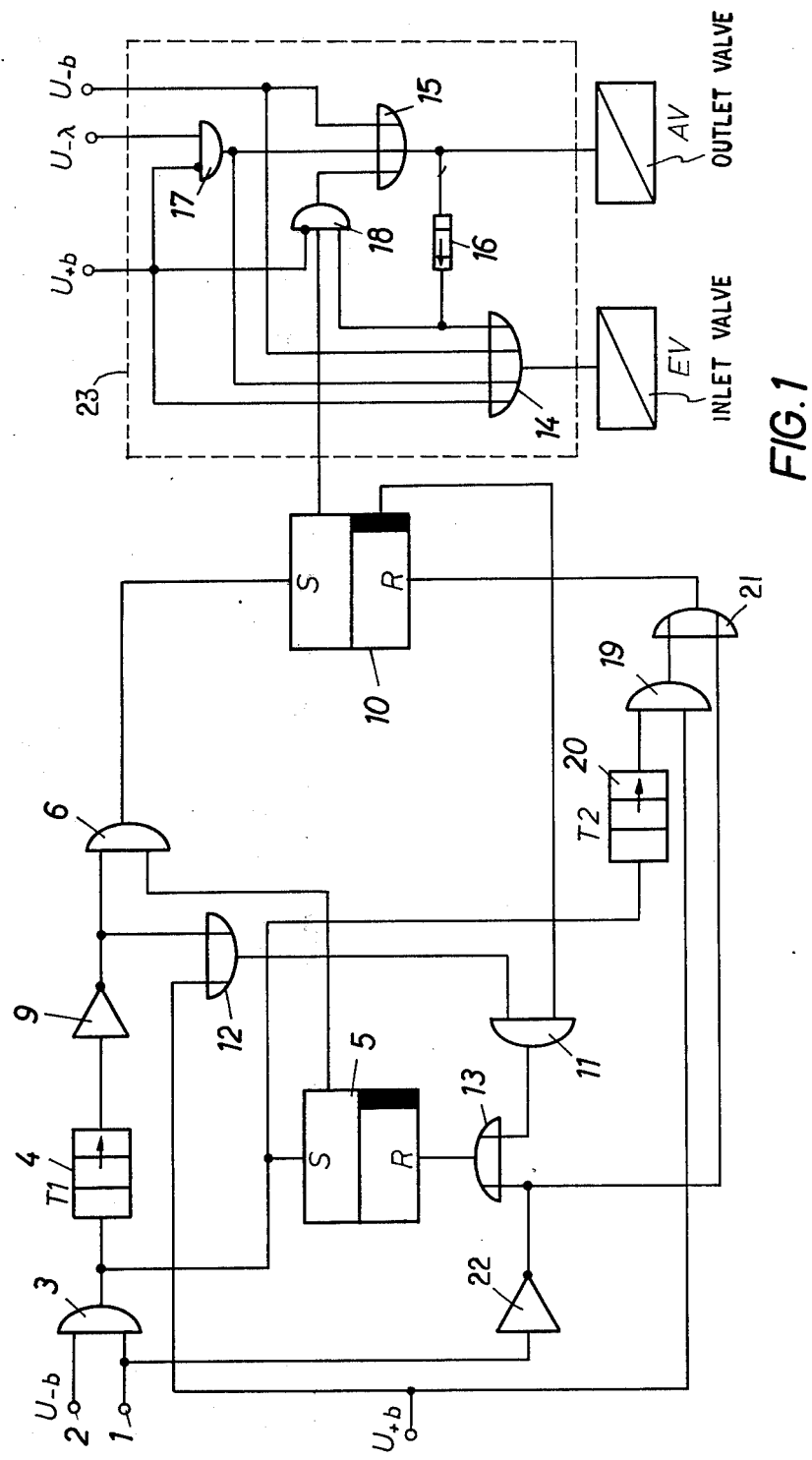
FIG. 1 is a logic circuit diagram showing one embodiment of the invention.

Referring now to FIG. 1, there is shown a circuit according to the invention having an input terminal 1 at which an L signal ($AV_{Delay}$ signal) is present if the antilocking control system (the remainder of which is not shown in this figure) is operating, thus enabling the AND gate 3. Upon the appearance of a wheel deceleration signal $U_{-b}$ at terminal 2, the AND gate 3 produces an output signal which actuates a timer member 4. The output signal L from AND gate 3 is simultaneously fed to the set input S of a bistable member 5, e.g., a flip-flop, to cause bistable member 5 to be switched into the set posiion, thus enabling AND gate 6.

The actuation of timer member 4 causes this member, as a result of its time constant, to produce an output signal which in effect extends the signal $U_{-b}$ by a period of time T1. Due to the presence of inverter 9, the AND gate 6 will not become conductive until the output signal from the timer member 4 has ceased. At that time, the output of inverter 9 becomes an L signal, causing AND gate 6 to produce an L signal at its output which is fed to the set input S of a bistable member 10 causing same to be switched to the set position. Simultaneously the L signal produced by inverter 9 is fed via OR gate 12, AND gate 11 (which has been enabled by the reset output signal of member 10), and OR gate 13 to the reset input R of bistable member 5, causing same to be switched back to the reset position, and thus removing the enabling signal from AND gate 6.

The bistable member 5 can also be reset if, when the bistable member 10 is not in its set position, a wheel acceleration signal $U_{+b}$ is generated before the end of the time period T1, i.e., while the timer member 4 is producing an output signal. That is, such a wheel acceleration signal $U_{+b}$ will reset bistable member 5 via OR gate 12, AND gate 11 and OR gate 13. Since resetting of the bistable member 5 removes the enabling signal from AND gate 6, the later output signal from inverter 9 at the end of time period T1 will not reach the set input S of bistable member 10. Consequently, the generation of an acceleration signal $U_{+b}$ prior to the end of time period T1 will prevent the bistable member 10 from being switched to its set position.

Figure 2:
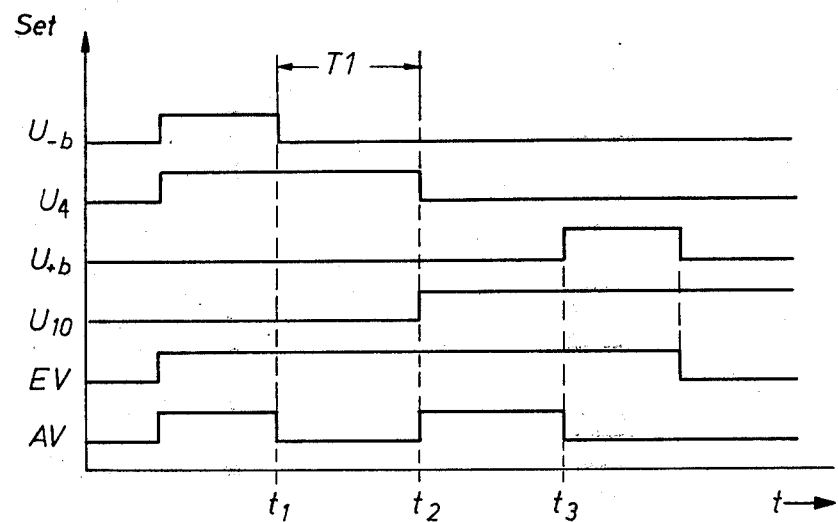
FIGS. 2 and 3 are diagrams used to explain the operation of the circuit of FIG. 1.

The sequence for setting bistable member 10 is shown in the diagram of FIG. 2. The first line of this diagram shows The deceleration signal $U_{-b}$ which actuates the timer member 4. At the output of timer member 4 the signal $U_4$ is obtained which corresponds to the signal $U_{-b}$ extended by time period T1. Since, according to the illustrated signals, no $U_{+b}$ signal is generated during the time period T1, bistable member 10 will switch to its set position at time $t_2$ and its output signal $U_{10}$ serves to immediately initiate pressure reduction and to extend this pressure reduction during the following cycles beyond the end of the $U_{-b}$ signal until the occurrence of a $U_{+b}$ signal. This means that from time $t_2$ until time $t_3$ the normally closed outlet valve AV is additionally excited.

As shown in FIG. 1, the specific circuiry 23 for carrying out the actual control of the inlet and outlet valves EV and AV, respectively, involves OR gates 14 and 15, timer member 16 and AND gates 17 and 18. With the illustrated arrangement, a wheel deceleration signal $U_{-b}$ and/or a slip signal $U_{-\lambda}$ will excite, via OR gates 14 and 15, the inlet valve EV and the outlet valve AV, respectively, while an acceleration signal $U_{+b}$ will excite the inlet valve EV via the OR gate 14. In order to assure constant pressure during normal operation between the end of the deceleration signal $U_{-b}$ or the slip signal $U_{-\lambda}$ and the beginning of the acceleration signal $U_{+b}$, a timer member 16 is provided between the output of OR gate 15 and an input of OR gate 14 to effectively extend the actuating signal for the outlet valve AV by a given period and utilize same to keep the inlet valve EV closed for this period.

The slip signal $U_{-\lambda}$ is fed to the OR gates 14 and 15 via an AND gate 17 to whose other input, which is an inverted input, is fed the acceleration sinal $U_{+b}$. Consequently AND gate 17 and thus the $U_{-\lambda}$ signal are blocked by the occurrence of an acceleration signal $U_{+b}$.

The set output of bistable member 10 is fed to one input of the AND gate 18 which has a second input connected to the output of timer member 16 and a third inverted input for reception of an acceleration signal $U_{+b}$. The set output signal from bistable member 10 travels via AND gate 18 and OR gate 15 to the outlet valve AV and effects pressure reduction if outlet valve AV has responded and the time constant of member 16 is still running and as long as no $U_{+b}$ signal is present. That is, upon completion of setting of the bistable member 10 the pressure is reduced until the occurrence of the acceleration signal $U_{+b}$, and in the following cycles the pressure is reduced beyond the end of the deceleration signal $U_{-b}$ until the beginning of the acceleration signal $U_{+b}$.

The bistable member 10 will be reset if within a time period T2, which is less than T1, e.g. $T2 \approx T1/2$, from the end of a deceleration signal $U_{-b}$ an acceleration signal $U_{+b}$ appears. This is accomplished by a timer member 20, which is also actuated by the output signal from AND gate 3 and in which the deceleration signal $U_{-b}$ is extended by time period T2, and by an AND gate 19 whose output is connected via an OR gate 21 to the reset input of bistable member 10. Resetting of bistable member 10 as well as of bistable member 5 may also be effected via inverter 22 and OR gates 21 and 13 respectively of the AV Delay signal disappears from terminal 1 at the end of the regulation.

Figure 3:
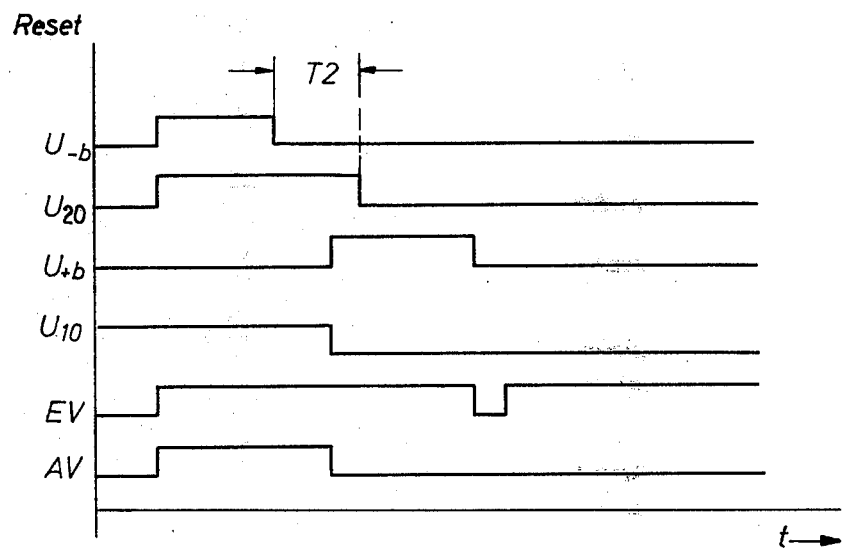

The resetting process for bistable member 10 is shown in the diagram of FIG. 3. As shown the appearance of an acceleration signal $U_{+b}$ prior to the end of the signal $U_{20}$ causes member 10 and the signal $U_{10}$ to cease. Thus pressure will no longer be reduced beyond the end of the deceleration signal $U_{-b}$.

In FIG. 4 a block diagram of an antilocking control system according to the invention is shown. There only one sensor 30 is provided, which delivers a signal proportional to the wheel speed to a block 31 in which the slip-signal $U_{-\lambda}$, an acceleration signal $U_{+b}$ and a deceleration signal $U_{-b}$ are generated. The content of the block 31 may be similar to the circuit of FIG. 3 of U.S. Pat. No. 3,754,797, but it is assumed that the acceleration- and deceleration signals are generated by means of a discriminator. The three output signals of block 31 are fed to the block 32 which corresponds to circuit 23 of FIG. 1, but which may contain additional logic elements, for example, similar to those represented in FIG. 3 of the above mentioned U.S. Patent. The inlet and outlet valves EV and AV are connected to the outlets of block 32. The block 33 of FIG. 4 into which the signals $U_{+b}$ and $U_{+b}$ and via line 34 also the output signal ($AV_{Delay}$) of timer element 16 of FIG. 1 or timer element 18 of FIG. 3 of the above mentioned Patent are fed contains the circuit of FIG. 1 without circuit 23 and the valves EV and AV. The output of this block 33 is connected to the block 32.

Figure 5:
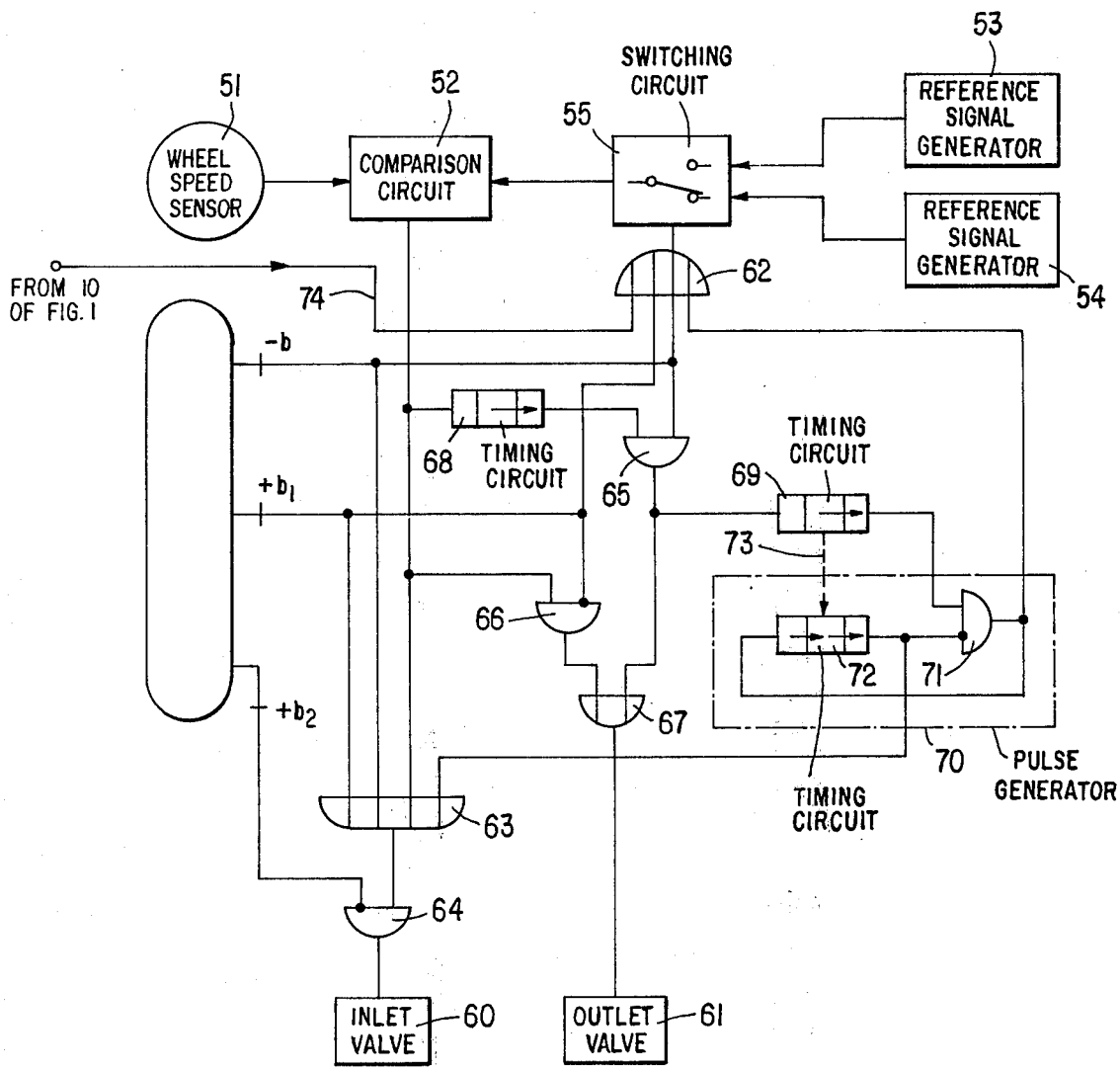
FIG. 5 is a block diagram of the control circuit of U.S. Pat. No. 3,754,797 which has been modified so that the special operation according to the invention is achieved in a special manner.

The determination according to the invention as to whether upon completion of the pressure reduction signal an acceleration signal appears within a prescribed period of time, can also be used with an antilocking control system of the type disclosed in German patent application No. P 20 63 944.5-21, which corresponds to U.S. Pat. No. 3,754,797, issued Aug. 28, 1973, to A. Rodi et al, the subject matter of which is incorporated in FIG. 5. In this antilocking control system, the wheel speed signal of sensor 51 is alternatingly compared in block 52 with two different reference values of the blocks 53 and 54 which are at least approximated to the behavior of the vehicle speed, with the smaller reference value 54 normally serving as the comparison value. Upon the occurrence of a deceleration signal $-b$ — and also during the occurrence of an acceleration signal $+b_1$ — the system is switched to the higher reference value 53 as the comparison value by means of switching device 55 and if the wheel speed signal falls below this switched-on reference value, pressure reduction is initiated via gates 63 and 64 to inlet valve 60 and via gates 66 and 67 to outlet valve 61. Pressure reduction is thus effected at the presence of a deceleration signal (gates 65 and 67) and when the higher reference value is not reached (low slip value). When the deceleration signal $-b$ disappears, and thus the comparison arrangement is switched back to the lower reference value, no further pressure reduction takes place unless the wheel speed also drops below the lower reference value (high slip value). It should be mentioned in passing that while the acceleration signal $+b_1$ in this known solution reactivates the higher reference value, pressure reduction upon the occurrence of the acceleration signal cannot take place due to blocking of the output signal from the comparator 52. The circuit elements 69 – 73 represent an pulse generator, which is of no interest in connection wih the invention.

The principle of the present invention is applied in such a design of an antilocking control system in that upon the determination of the absence of the wheel acceleration signal within a time period $T_1$ from the end of pressure reduction, i.e., from the end of the deceleration signal, the higher comparison value is switched on via line 74 and gate 62 to which the output signal of the bistable device of FIG. 1 is fed so that pressure reduction will again take place. Only upon the occurrence of the acceleration signal or if the higher reference value is exceeded will this pressure reduction be interrupted. In the following cycles the pressure reduction is maintained after the end of the deceleration signal and with values below the higher comparison value, which is applicable during special operation, until the occurrence of the acceleration signal. Only if early appearance of the acceleration signal indicates different road conditions, will the system be switched back to normal operation, i.e., the additional control signal for switching to the higher reference value disappears.

It has been found that it is favorable to make the special operation effective quite generally, i.e., without waiting for the above-described test, during pressure reduction based on only a slip signal (without the presence of a deceleration signal). In this case a special bistable member can be used or the above-mentioned second bistable member 10 can be utilized for this purpose as well. In FIG. 6 only the second bistable member 10 of FIG. 1 is shown to which besides the set-pulse of gate 6 a set pulse via AND-gate 80 is fed, if a slip-signal $U_{-\lambda}$ occurs and no deceleration signal is present. A further set pulse is generated in FIG. 6, by means of bistable member 81 and AND-gate 82. Bistable member 81 is set by the return flank of the acceleration signal $U_{+b}$ and thus an output signal of AND-gate 82 occurs, if at the end of the acceleration signal a slip-signal is still present. The reset of bistable member 81 occurs when the output-signal of AND-gate 82 ceases. In addition to the reset line coming from gate 21 of FIG. 1 in FIG. 6, a further reset line 83 is provided to which a signal is fed if a high acceleration $+b_2$ is present. Then via OR-gate 84 the bistable member 10 is reset.

A signal which indicates special operation can be utilized, as a signal which indicates the presence of a low $\mu$, for further control functions. For example, this signal can be used, when the system falls below a speed threshold, to switch from pressure regulation operation to pressure control operation or to extend the pressure reduction period, for example at low $\mu$, which can be done, for example, by reducing the threshold or switching on a timer member at the end of the deceleration signal to extend pressure reduction for a period of time.

It will be understood that the above description of the present invention is susceptible to various modifications, changes and adaptations, and the same are intended to be comprehended within the meaning and range of equivalents of the appended claims.

What is claimed is:

1. In an antilocking control system for wheel brakes of a wheeled vehicle, comprising sensors for monitoring the rotational behavior of the wheels, an evaluation circuit which receives the signals from the sensors and whick generates control signals based on the signals from the sensors, and a pressure reduction unit which receives the control signals from the evaluation circuit and which in addition to a setting for pressure buildup has a setting for pressure reduction and a setting for keeping the pressure at least approximately constant, the evaluation circuit including switching means for, within a single control cycle, (a) emitting a control signal for causing pressure reduction upon the occurrence of a tendency to lock, (b) emitting a control signal for keeping the pressure constant upon a subsequent wheel acceleration of a certain value and (c) normally also emitting a control signal for keeping the pressure constant in the transition phase between the end of the generated control signal for reducing pressure and the beginning of the signal indicating wheel acceleration $(U_{+b})$; the improvement wherein said evaluation circuit further includes; a monitoring circuit means for determining whether within a given period of time T1 after the end of the pressure reduction signal a wheel acceleration signal $(U_{+b})$ occurs and, upon the absence of such a signal within said period of time T1, for effecting a change in the normal regulation operation by causing the pressure reduction in subsequent control cycles to be prolonged until the occurrence of an acceleration signal $(U_{+b})$ (Special operation); and further switching means for resetting the system to normal operation if an acceleration signal $(U_{+b})$ appears within a period of time T2 < T1 after the end of a subsequent pressure reduction signal.

2. An antilocking control system as defined in claim 1 wherein $T2 \approx \frac{1}{2} T1$.

3. An antilocking control system as defined in claim 1 wherein said monitoring circuit means includes: first and second bistable members; first logic circuit means responsive to said pressure reduction signal for setting said first bistable member; second logic circuit means responsive to said acceleration signal for permitting resetting of said first bistable member; third logic circuit means responsive to a signal present at the setting output of said first bistable member at the end of T1 for switching said second bistable member to its set state, whereby the then appearing output signal from said second bistable member effects a pressure reduction; and fourth logic circuit means for resetting said first bistable member at the end of the period of time T1 when said second bistable member is to be set.

4. An antilocking control system as defined in claim 3 wherein said further switching means includes fifth logic circuit means for resetting said second bistable member upon the appearance of an acceleration signal before the end of said period of time T2.

5. An antilocking control system as defined in claim 3 wherein said monitoring circuit further includes: a further bistable member; means for setting said further bistable member upon the occurrence of a pressure reducing slip signal to cause actuation of said special operation, and means for resetting said further bistable member if the acceleration signal occurs before expiration of the period of time T2.

6. An antilocking control system as defined in claim 5 wherein said further bistable member is identical with said second bistable member.

7. An antilocking control system as defined in claim 1 wherein additional switching means are provided for also switching said system to special regulation to begin after the pressure reduction when a slip signal is still present at the end of the acceleration signal.

8. An antilocking control system as defined in claim 1 wherein additional switching means are provided for interrupting special operation if the wheel acceleration is high.

9. An antilocking control system as defined in claim 1 wherein said evaluation circuit includes comparison means for alternatingly comparing the wheel speed signal with one of two different reference values and for producing a pressure reduction signal when said wheel speed signal falls below one of said reference values; additional switching means for normally causing the lower of said reference values to be effective as the comparison value and for causing the higher of said reference values to become effective as the comparison value, upon the presence of a wheel deceleration signal, and means responsive to an acceleration signal for suppressing pressure reduction signals; and wherein said monitoring circuit switches to special operation in that said higher reference value is connected and remains connected until an acceleration signal $(U_{+b})$ appears before expiration of said period of time T2.

10. An antilocking control system as defined in claim 1 wherein said monitoring circuit means, upon the absence of said wheel acceleration signal $(U_{+b})$ within said period of time T1, immediately causes a pressure reduction until the next wheel acceleration signal $(U_{+b})$.

* * * * *